(12) United States Patent
Motoyama

(10) Patent No.: US 10,126,675 B2
(45) Date of Patent: Nov. 13, 2018

(54) IMAGE FORMING APPARATUS

(71) Applicant: CANON KABUSHIKI KAISHA, Tokyo (JP)

(72) Inventor: Hajime Motoyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 190 days.

(21) Appl. No.: 15/351,231

(22) Filed: Nov. 14, 2016

(65) Prior Publication Data
US 2017/0082940 A1 Mar. 23, 2017

Related U.S. Application Data

(63) Continuation of application No. PCT/JP2015/063438, filed on May 11, 2015.

(30) Foreign Application Priority Data

May 16, 2014 (JP) ................. 2014-102481

(51) Int. Cl.
G03G 15/043 (2006.01)
B41J 2/47 (2006.01)
H04N 1/113 (2006.01)
G03G 15/04 (2006.01)
G03G 15/00 (2006.01)

(52) U.S. Cl.
CPC ............ *G03G 15/043* (2013.01); *B41J 2/47* (2013.01); *G03G 15/04072* (2013.01); *H04N 1/113* (2013.01); *G03G 15/80* (2013.01); *G03G 2215/0129* (2013.01); *G03G 2215/0404* (2013.01)

(58) Field of Classification Search
CPC ......... G03G 15/043; G03G 2215/0404; G03G 2215/049
See application file for complete search history.

(56) References Cited

FOREIGN PATENT DOCUMENTS

| JP | 63-213983 A | 9/1988 |
|---|---|---|
| JP | 2003-039724 A | 2/2003 |
| JP | 2003-191524 A | 7/2003 |
| JP | 2011-198877 A | 10/2011 |
| JP | 2011-207213 A | 10/2011 |

*Primary Examiner* — Erika J Villaluna
(74) *Attorney, Agent, or Firm* — Canon USA, Inc. I.P. Division

(57) ABSTRACT

An image forming apparatus includes switches configured to switch a state of an operation performed by an assist circuit for a current supplied to a light-emitting element, in such a manner that the assist circuit corrects a value of a current supplied from a constant current source to the light-emitting element when a switching current is supplied in at least a period during which laser light scans a photoconductive drum and the assist circuit does not correct a value of a current supplied from the constant current source to the light-emitting element to make laser light incident on a photodiode to control a value of a bias current.

14 Claims, 12 Drawing Sheets

IMAGE FORMING APPARATUS

CROSS-REFERENCE TO RELATED APPLICATIONS

This application is a Continuation of International Patent Application No. PCT/JP2015/063438, filed May 11, 2015, which claims the benefit of Japanese Patent Application No. 2014-102481, filed May 16, 2014, both of which are hereby incorporated by reference herein in their entirety.

TECHNICAL FIELD

The present invention relates to the control of a bias current value supplied to a laser light source used for an electrophotographic image forming apparatus.

BACKGROUND ART

In image forming apparatuses including a laser scanning optical system as an exposure device, a surface-emitting laser (or a vertical-cavity surface-emitting laser) (hereinafter referred to as a VCSEL) has recently been used as a light source of the exposure device to increase the productivity or resolution of the image forming apparatuses. VCSELs have features of easy multibeam formation but, as illustrated in FIG. 12C, a large time delay in a rising edge of a waveform representing an amount of light (hereinafter referred to as a "light-amount waveform"). A delay in a rising edge of the light-amount waveform has an effect on the formation of an electrostatic latent image on a photoconductive drum, and thus leads to a reduction in the quality of an image to be formed on a recording sheet. To address this issue, there has been proposed a method for correcting the rate of rise of the light-amount waveform (see, for example, Japanese Patent Laid-Open No. 63-213983). Japanese Patent Laid-Open No. 63-213983 discloses a method for correcting a rising edge of the light-amount waveform by supplying a correction current to a semiconductor laser in synchronization with the start of the supply of a current based on image data to the semiconductor laser.

There is also known an image forming apparatus configured to execute automatic power control (APC) of a plurality of light-emitting elements over a period during which a non-image area is scanned within a scan period (for example, Japanese Patent Laid-Open No. 2011-207213). Japanese Patent Laid-Open No. 2011-207213 discloses a method for determining a bias current value from a current-light characteristic of a semiconductor laser which indicates the correspondence between a value of a current supplied to the semiconductor laser and an amount of light emitted from the semiconductor laser. In the following, APC for controlling a bias current value is referred to as "bias APC". The image forming apparatus disclosed in Japanese Patent Laid-Open No. 2011-207213 executes APC of a plurality of light-emitting elements over a period during which a non-image area is scanned within a scan period. The disclosed image forming apparatus performs APC to control a bias current value supplied to the semiconductor laser within a period during which an image-forming area is scanned and which is subsequent to the period during which the non-image area is scanned.

However, the application of a correction current to the semiconductor laser for the control of a bias current value results in the bias current value being set low due to the effect of the correction current.

SUMMARY OF INVENTION

The present invention provides prevention or reduction of a decrease in accuracy with which a bias current value is set.

An aspect of the present invention provides an image forming apparatus for forming an image based on input image data. The image forming apparatus includes a semiconductor laser including a light-emitting element configured to emit laser light; a light-receiving element configured to receive the laser light emitted from the light-emitting element; a deflection unit configured to deflect the laser light emitted from the light-emitting element so that the laser light scans a photoconductor; a drive unit configured to drive the semiconductor laser, the drive unit including a current supply unit configured to supply a current to the light-emitting element, the current supply unit being configured to, in at least a period during which the laser light scans the photoconductor, supply a bias current to the light-emitting element regardless of the image data and supply a switching current to be superimposed on the bias current to the light-emitting element on the basis of the image data, a correction unit configured to correct a value of the current supplied from the current supply unit to the light-emitting element to correct a rising edge of a waveform representing an amount of laser light emitted from the light-emitting element, and a bias current control unit configured to control a value of the bias current in accordance with a light receiving result of the light-receiving element which has received the laser light emitted from the light-emitting element upon a current being supplied to the light-emitting element; and a control unit configured to switch a state of an operation performed by the correction unit for the current supplied to the light-emitting element, in such a manner that the correction unit corrects a value of the switching current when the switching current is supplied to the light-emitting element on the basis of the image data and in such a manner that the correction unit does not correct a value of the current supplied from the current supply unit to the light-emitting element when the laser light is made incident on the light-receiving element to control the value of the bias current.

Further features of the present invention will become apparent from the following description of exemplary embodiments with reference to the attached drawings.

DESCRIPTION OF EMBODIMENTS

For comparison with the following exemplary embodiment, the effect of the control of a current value by a correction circuit on the execution of automatic power control for setting a bias current value (hereinafter referred to as "bias APC") will be described in detail.

Description of Correction Circuit

A light source of an exposure device in an image forming apparatus is required to have high-speed responsivity. Given that a switching frequency of a laser light source per pixel is represented by F, a relationship regarding the switching frequency F is expressed by the following formula. The switching frequency is a frequency of an operation (switching operation) for turning on or off the laser light source.

$$F = 4 \times \pi \times F\theta \times (DPI/25.4)^2 \times PS/(N \times M)$$

Fθ: the coefficient of an Fθ lens
PS: the traveling speed (process speed) of laser light on a surface of a photoconductor in a direction substantially perpendicular to a scanning direction of the laser light
DPI: resolution
N: the number of faces of a polygon mirror
M: the number of beams The formula given above shows that the switching frequency F of the laser light source is proportional to the process speed PS and the square of the resolution DPI. That is, an improvement in the productivity or resolution of the image forming apparatus increases the switching frequency F of the laser light source.

The rise time and fall time of a waveform representing an amount (hereinafter referred to as a "light-amount waveform") of laser light emitted from the laser light source when a switching current is supplied to the laser light source have an effect on the size of dots. Here, the time required from the state where the laser light source is not supplied with a switching current based on image data (in this exemplary embodiment, the state where the laser light source is supplied with a bias current) to a predetermined amount of light (e.g., 90% of a target amount of light) is referred to as the rise time regarding the amount of light, and the time required from the predetermined amount of light to the state where the laser light source is turned off is referred to as the fall time regarding the amount of light. Exposure based on image data produces a thin electrostatic latent image if the rise time in response to the supply of a switching current to the laser light source increases, and a thick electrostatic latent image if the fall time increases. The effect of the rise time and the fall time on the quality of an image increases as the switching frequency F of the laser light source increases.

Figure 12A:
FIGS. 12A to 12C illustrate waveforms in the related art.
Figure 12B:
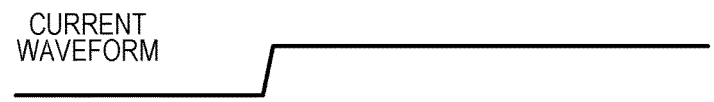
Figure 12C:
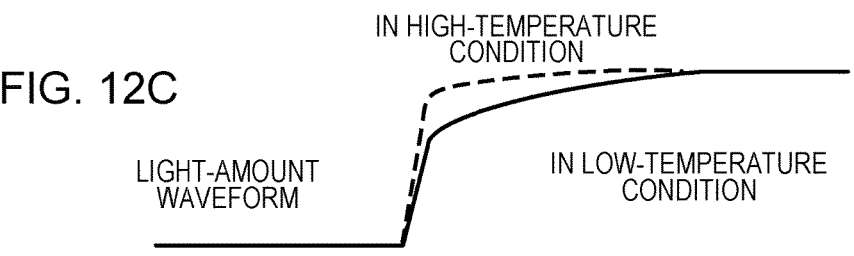

In particular, a vertical-cavity surface-emitting laser used as a laser light source has a feature that the light-amount waveform of laser light emitted from the laser light source after a drive current is supplied to the laser light source rises with a delay with respect to the waveform of the drive current. The vertical-cavity surface-emitting laser is hereinafter referred to as a VCSEL. FIG. 12A illustrates an input waveform of a video signal (a pulse width modulated (PWM) signal) generated based on image data. FIG. 12B illustrates a waveform of a current (current waveform) supplied to the laser light source in accordance with the PWM signal. FIG. 12C illustrates a light-amount waveform of laser light. In FIGS. 12A, 12B, and 12C, the horizontal axis represents time. When a current is supplied to a light-emitting element in accordance with a PWM signal, the light-emitting element emits laser light corresponding to the supplied current. As illustrated in FIGS. 12A, 12B, and 12C, the current waveform rises in response to a rising edge of the PWM signal, and the light-amount waveform rises in response to a rising edge of the current waveform. The light-amount waveform is delayed with respect to the PWM signal. As illustrated in FIG. 12C, some laser light sources, such as VCSELs, have a characteristic that the light-amount waveform rapidly rises up to a certain amount of light less than or equal to a target amount of light and then gradually rises to the target amount of light.

To address the issue described above, a configuration is conceived for correcting a rising edge of the light-amount waveform by supplying a correction current for correcting a rising edge of the current supplied based on image data. That is, there is conceived an image forming apparatus including a correction circuit that supplies a correction current as an assist current in synchronization with the start of the supply of a drive current to the laser light source.

There is also known an image forming apparatus configured to apply a current less than or equal to a threshold current value to a light-emitting element as a bias current even when the light-emitting element is turned off to prevent or substantially reduce a decrease in the illumination responsivity of the light-emitting element. The term "threshold current value", as used herein, refers to a reference current value by which spontaneous light emission (also referred to as spontaneous emission) and stimulated emission are separated. The supply of a current less than or equal to the threshold current value results in spontaneous emission in which a very small amount of laser light is emitted. An electrophotographic image forming apparatus is designed not to cause a change in the potential on a photoconductive drum in response to laser light emitted from a laser during spontaneous emission. In contrast, the supply of a current having a value larger than the threshold current value results in stimulated emission in which the amount of light increases by a larger amount with respect to the amount of increase of the current than in spontaneous emission. In an electrophotographic image forming apparatus, an electrostatic latent image is formed on a photoconductive drum by using laser light emitted from a light-emitting element during stimulated emission.

Figure 12D:
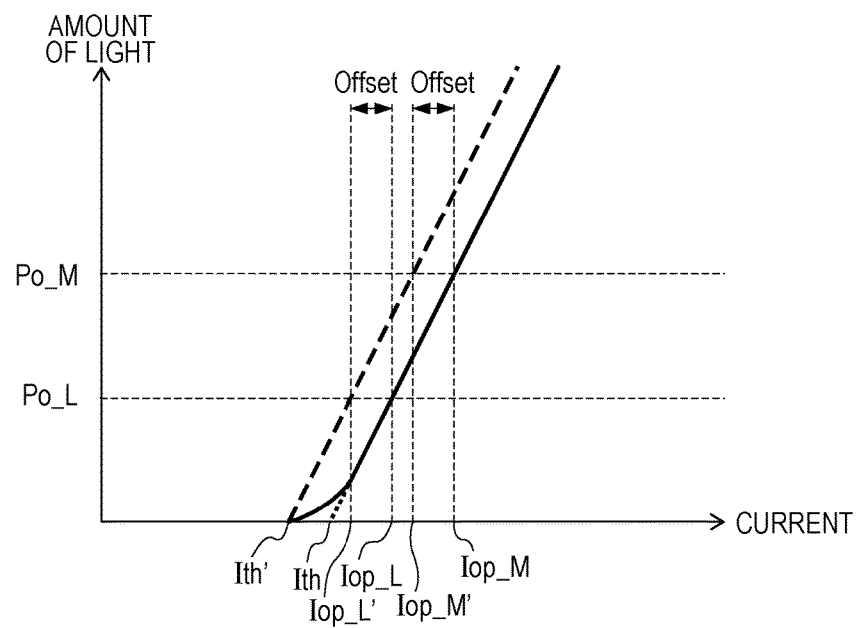
FIG. 12D illustrates offsets caused by a correction circuit in the related art.

However, a correction current is supplied to a laser light source when automatic power control for setting a bias current value (bias APC) is executed, which results in a decrease in accuracy with which a bias current value is set. In FIG. 12D, the horizontal axis represents a drive current which flows through a light-emitting element and the vertical axis represents an amount of light emitted from the light-emitting element. First, automatic power control (APC) is performed so that the amount of light emitted from the light-emitting element is equal to a first amount of light Po_M, and a current value Iop_M which flows through the light-emitting element at this time is detected by a detection circuit. At this time, if a correction current is supplied from the correction circuit to the light-emitting element, the detection circuit detects a current value Iop_M' including the value of the correction current. Then, APC is performed so that the amount of light emitted from the light-emitting element is equal to a second amount of light Po_L, and a current value Iop_L which flows through the light-emitting element at this time is detected by the detection circuit. If a correction current is supplied from the correction circuit to the light-emitting element, however, the detection circuit detects a current value Iop_L' including the value of the correction current. Hence, a threshold current value calculated from the current value Iop_M' and the current value Iop_L', which are detected by the detection circuit, is a value Ith' at the intersection of a broken straight line and the X axis. In this manner, as a result of the supply of a correction current from the correction circuit to the light-emitting element during the execution of bias APC, a value (Ith') different from a correct threshold current value Ith at the intersection of a solid straight line and the X axis is obtained. Since the value of a bias current Ibias is set on the basis of the threshold current value Ith, a reduction in accuracy with which the threshold current value Ith is set leads to a reduction in accuracy with which the bias current Ibias is set.

EXEMPLARY EMBODIMENT

Image Forming Apparatus

Figure 1:
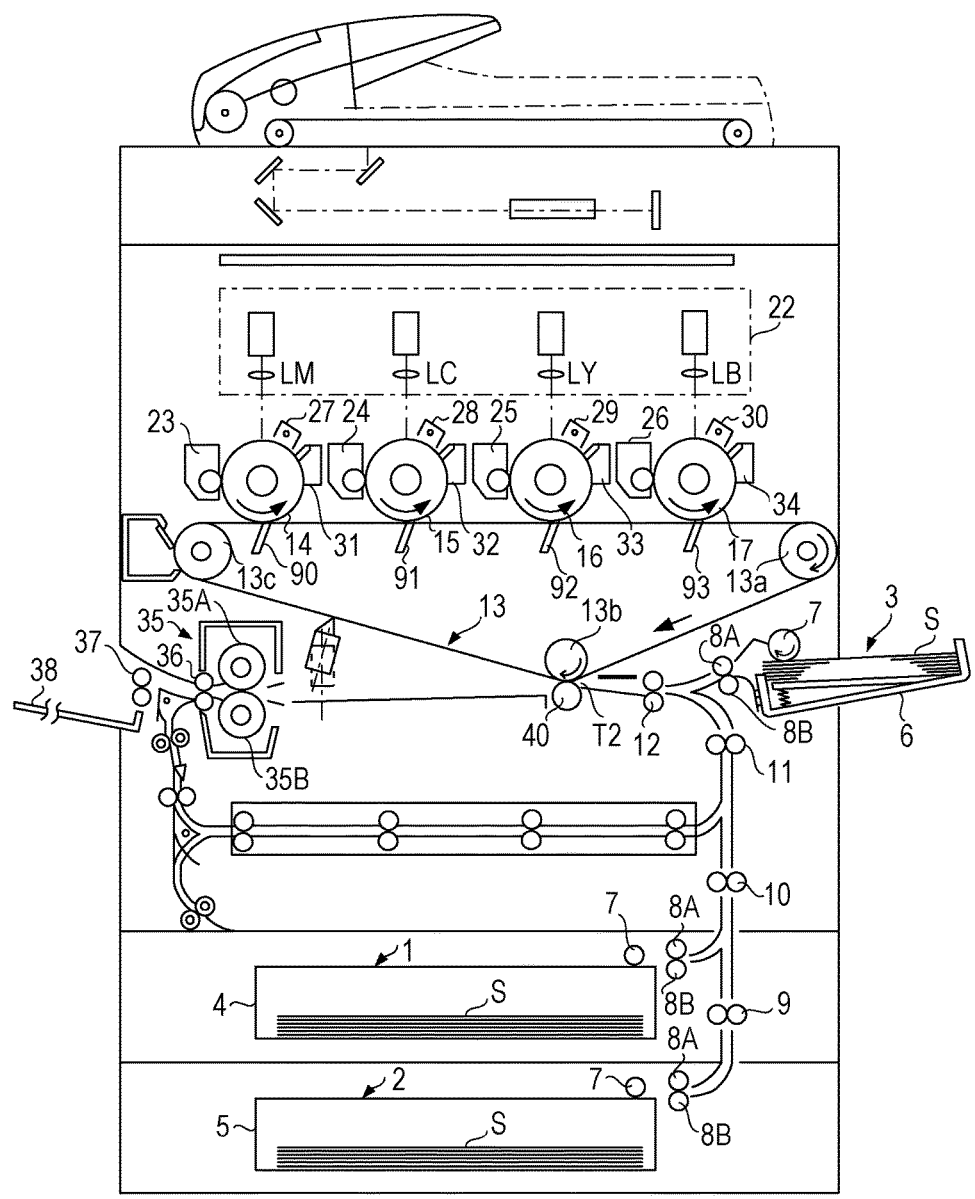
FIG. 1 illustrates a configuration of an image forming apparatus according to an exemplary embodiment.

FIG. 1 illustrates a configuration of an image forming apparatus (color image forming apparatus) for obtaining a color image according to an exemplary embodiment. A basic image forming operation will be described with reference to FIG. 1. The color image forming apparatus includes two cassette sheet feeding units 1 and 2 and a manual sheet feeding unit 3. Sheets of transfer paper S, which are recording media, are selectively fed from the cassette sheet feeding units 1 and 2 and the manual sheet feeding unit 3 (hereinafter referred to simply as the sheet feeding units 1, 2, and 3). The sheets of transfer paper S are stacked on cassettes 4 and 5 and a tray 6 of the sheet feeding units 1, 2, and 3, and are picked up by pickup rollers 7, starting from the respective uppermost sheets of transfer paper toward a conveyance path. From sheets of transfer paper S picked up by one of the pickup rollers 7, only the uppermost sheet of transfer paper S is separated by a separation roller pair 8 having a feed roller 8A serving as a conveyance unit and a retard roller 8B serving as a separation unit. The sheet of transfer paper S is then conveyed to a registration roller pair 12 which is not rotating. A sheet of transfer paper S fed from the cassette 4 or 5, which is farther away from the registration roller pair 12, passes through a plurality of conveyance roller pairs 9 and/or 10 and 11 and is conveyed to the registration roller pair 12. The sheet of transfer paper S conveyed to the registration roller pair 12 is curled to form a predetermined loop upon the leading end of the sheet being forced against a nip portion of the registration roller pair 12. Then, the movement of the sheet of transfer paper S is temporarily stopped. The formation of the loop allows the sheet of transfer paper S to be corrected for skew.

A long intermediate transfer belt 13, which is an intermediate transfer member, is disposed downstream of the registration roller pair 12 in a conveyance direction of the sheet of transfer paper S (hereinafter referred to simply as downstream). The intermediate transfer belt 13 is stretched over a drive roller 13a, a secondary transfer counter roller 13b, and a tension roller 13c, and is set to have substantially a triangular shape as viewed in cross section. The intermediate transfer belt 13 rotates clockwise in FIG. 1. Photoconductive drums 14, 15, 16, and 17 are sequentially arranged on an upper surface of a horizontally extending portion of the intermediate transfer belt 13 in the rotation direction of the intermediate transfer belt 13. The photoconductive drums 14, 15, 16, and 17 are a plurality of photoconductors on which toner images of different colors are formed and borne. The photoconductive drum 14, which is located most upstream in the rotation direction of the intermediate transfer belt 13, carries a toner image of magenta color (M). The next upstream photoconductive drum 15 carries a toner image of cyan color (C). The next upstream photoconductive drum 16 carries a toner image of yellow color (Y). The photoconductive drum 17, which is located most downstream in the rotation direction of the intermediate transfer belt 13, carries a toner image of black color (B).

First, the photoconductive drum 14 (the photoconductor), which is located most upstream along the intermediate transfer belt 13, starts to be exposed to laser light (which is also a light beam) LM based on a magenta component image, and an electrostatic latent image is formed on the photoconductive drum 14. The electrostatic latent image formed on the photoconductive drum 14 is rendered visible with toner of magenta color supplied from a developing device 23. Then, after the elapse of a predetermined period of time measured from the start of exposure of the photoconductive drum 14 to the laser light LM, the photoconductive drum 15 starts to be exposed to laser light LC based on a cyan component image, and an electrostatic latent image is formed on the photoconductive drum 15. The electrostatic latent image formed on the photoconductive drum 15 is rendered visible with toner of cyan color supplied from a developing device 24. Then, after the elapse of a predetermined period of time measured from the start of exposure of the photoconductive drum 15 to the laser light LC, the photoconductive drum 16 starts to be exposed to laser light LY based on a yellow component image, and an electrostatic latent image is formed on the photoconductive drum 16. The electrostatic latent image formed on the photoconductive drum 16 is rendered visible with toner of yellow color supplied from a developing device 25. Then, after the elapse of a predetermined period of time measured from the start of exposure of the photoconductive drum 16 to the laser light LY, the photoconductive drum 17 starts to be exposed to laser light LB based on a black component image, and an electrostatic latent image is formed on the photoconductive drum 17. The electrostatic latent image formed on the photoconductive drum 17 is rendered visible with toner of black color supplied from a developing device 26. Primary chargers 27, 28, 29, and 30 are disposed around the photoconductive drums 14, 15, 16, and 17, respectively, to uniformly charge the photoconductive drums 14, 15, 16, and 17. Cleaners 31, 32, 33, and 34 are further disposed to remove toner particles from the photoconductive drums 14, 15, 16, and 17, respectively, after the respective toner images have been transferred.

During the rotation of the intermediate transfer belt 13 in the clockwise direction, the intermediate transfer belt 13 passes through a transfer portion defined between the photoconductive drum 14 and a transfer charger 90, thus allowing the toner image of magenta color to be transferred onto the intermediate transfer belt 13. Then, the intermediate transfer belt 13 passes through a transfer portion defined between the photoconductive drum 15 and a transfer charger 91, thus allowing the toner image of cyan color to be transferred onto the intermediate transfer belt 13. Then, the intermediate transfer belt 13 passes through a transfer portion defined between the photoconductive drum 16 and a transfer charger 92, thus allowing the toner image of yellow color to be transferred onto the intermediate transfer belt 13. Finally, the intermediate transfer belt 13 passes through a transfer portion defined between the photoconductive drum 17 and a transfer charger 93, thus allowing the toner image of black color to be transferred onto the intermediate transfer belt 13. The transfer of the toner images of the respective colors from the photoconductive drums 14 to 17 onto the intermediate transfer belt 13 is performed at appropriate timing so that the toner images of magenta, cyan, yellow, and black colors are transferred onto the intermediate transfer belt 13 in such a manner so as to be superimposed on top of one another.

The sheet of transfer paper S is conveyed to the registration roller pair 12 and is corrected for skew. The registration roller pair 12 starts rotation at a timing so as to allow the toner images on the intermediate transfer belt 13 to be aligned in position with the leading end of the sheet of transfer paper S. Then, the sheet of transfer paper S is conveyed to a transfer portion T2 on the intermediate transfer belt 13 by the registration roller pair 12 and the toner images are transferred onto a surface of the sheet of transfer paper S. The transfer portion T2 is a portion where a secondary transfer roller 40 and the secondary transfer counter roller 13*b* abut against each other. The sheet of transfer paper S, which has passed through the transfer portion T2, is conveyed to a fixing device 35, which is a fixing unit. While passing through a nip portion defined by a fixing roller 35A and a pressure roller 35B in the fixing device 35, the sheet of transfer paper S is heated by the fixing roller 35A and is applied with pressure by the pressure roller 35B so that the toner images are fixed onto the surface of the sheet of transfer paper S. The sheet of transfer paper S, which has passed through the fixing device 35 and has been subjected to a fixing process, is conveyed to a discharge roller pair 37 by a conveyance roller pair 36, and is discharged onto a discharge tray 38 exposed to the outside. The color image forming apparatus illustrated in FIG. 1 is an example and may be a monochrome image forming apparatus, for example. The configuration of this exemplary embodiment is not construed in a limiting sense.

The color image forming apparatus further includes an exposure device 22 (a portion indicated by a one-dot chain line) for each of the photoconductive drums 14 to 17. The exposure devices 22 are optical scanning devices that irradiate the photoconductive drums 14 to 17 with laser light. Each of the exposure devices 22 is configured to emit a plurality of beams from a semiconductor laser used as a laser light source to meet the recent high-speed, high-quality requirements for a printer or a copying machine. This configuration allows exposure of a plurality of lines to be completed with a single scan using a rotating polygon mirror. In particular, surface-emitting lasers (VCSELs) have been of practical use instead of edge-emitting lasers and multibeam formation has been facilitated.

Exposure Device

Figure 2:
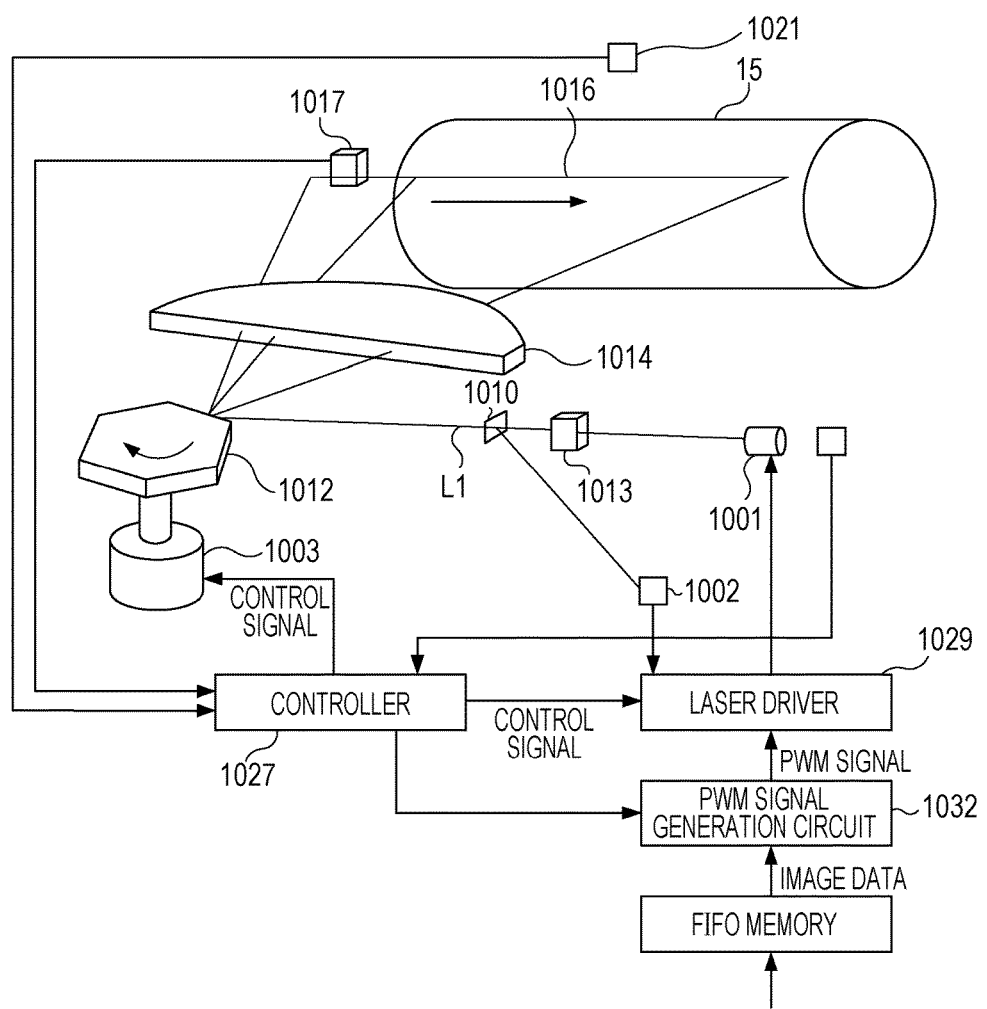
FIG. 2 illustrates a configuration of a semiconductor laser scanning optical system according to the exemplary embodiment.

An example of a multibeam semiconductor laser used in the image forming apparatus will be described hereinafter. FIG. 2 schematically illustrates a configuration of one of the four exposure devices 22 in FIG. 1 (corresponding to the one for cyan color). As illustrated in FIG. 2, an electrophotographic image forming apparatus includes an exposure unit that irradiates the photoconductive drum 15 with laser light to form a latent image corresponding to input image data on the photoconductive drum 15. In this exemplary embodiment, the exposure unit includes a monolithic laser light source 1001. The laser light source 1001 includes 16 light-emitting elements (laser diodes) LD1 to LD16 that emit laser light, that is, a plurality of light-emitting elements. A plurality of laser beams emitted from the laser light source 1001 are rendered parallel via a collimator lens 1013 and are incident on a beam splitter 1010. The beam splitter 1010 is disposed between the laser light source 1001 and a rotating polygon mirror 1012 along an optical path of the light beams emitted from the laser light source 1001. In this exemplary embodiment, the beam splitter 1010 is configured to reflect approximately 1% of an amount of laser light incident on the beam splitter 1010, which is assumed to be 100%, and to allow approximately 99% of the amount of laser light to pass therethrough. The laser light reflected by the beam splitter 1010 is incident on a photodiode (PD) 1002. The PD 1002 is a light-receiving element (photoelectric conversion element). The PD 1002 outputs a detection current having a value which is obtained as a light receiving result and which corresponds to the amount of incident laser light.

Laser light L1 corresponding to 99% of the amount of laser light incident on the beam splitter 1010, which has passed through the beam splitter 1010, is incident on a reflection face of the rotating polygon mirror 1012. The rotating polygon mirror 1012 is a deflection unit driven to rotate by a motor 1003. The rotating polygon mirror 1012 reflects the laser light L1 incident on the reflection face so that the laser light L1 scans the photoconductive drum 15. The laser light L1 reflected by the rotating polygon mirror 1012 passes through an Fθ lens 1014 and scans the photoconductive drum 15 in a main scanning direction (a direction indicated by an arrow in FIG. 2) at a constant speed. The photoconductive drum 15 is scanned by the laser light L1, and an electrostatic latent image 1016 is formed on the photoconductive drum 15 accordingly. The laser light L1 reflected by the rotating polygon mirror 1012 is incident on a beam detector (BD) 1017. The BD 1017 outputs a BD signal upon receipt of the laser light L1.

The BD signal output from the BD 1017 is input to a controller 1027. The controller 1027 transmits a write position signal to a PWM signal generation circuit 1032 in accordance with the BD signal input from the BD 1017. The PWM signal generation circuit 1032 receives input of multi-value image data (density data). The PWM signal generation circuit 1032 converts the multi-value image data into binary image data (bit data) corresponding to each of the light-emitting elements LD1 to LD16. Then, the PWM signal generation circuit 1032 outputs the bit data in synchronization with a clock signal to output a PWM signal which is input to a laser driver 1029. The PWM signal generation circuit 1032 controls the output timing of the data of the first pixel in the main scanning direction, which is synchronized with the clock signal on the basis of the BD signal.

The controller 1027 outputs a switch control signal to the laser driver 1029. The switch control signal is a control signal for controlling various switches, described below, included in the laser driver 1029 to be turned on or off.

A density sensor 1021 is a sensor for detecting the density of an image on the surface of the photoconductive drum 15 after an electrostatic latent image has been developed on the photoconductive drum 15, and outputs a detection result to the controller 1027. The controller 1027 outputs a gain control signal to an APC circuit, described below, included in the laser driver 1029 as a control signal on the basis of information concerning the density of the image input from the density sensor 1021. The controller 1027 outputs the gain control signal to control the amount of laser light emitted based on image data to be equal to a target amount of light. In the embodiment, the number of light-emitting elements is not limited to 16 and N light-emitting elements (where N is a natural number) may be included.

Operation of Exposure Device

Figure 3A:
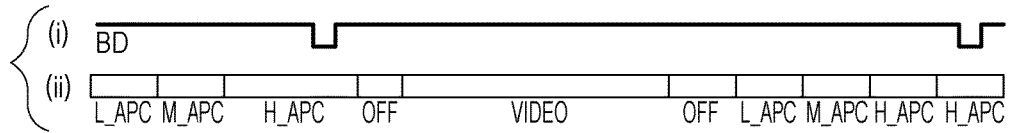
FIG. 3A illustrates an operation sequence of an exposure device according to the exemplary embodiment.

The configuration of the laser driver 1029 will now be described. An exemplary embodiment will be described taking, for ease of description, a configuration with the reduced number of LDs, namely, a configuration including two LDs, as an example. Parts (i) and (ii) of FIG. 3A illustrate the operation sequence of the exposure device 22 illustrated in FIG. 2 during a single scan. Part (i) of FIG. 3A illustrates the waveform of a BD signal output from the BD 1017, and part (ii) of FIG. 3A illustrates operation modes of the exposure device 22. In parts (i) and (ii) of FIG. 3A, the horizontal axis represents time. The operation modes of the exposure device 22 include APC modes, an OFF mode, and a VIDEO mode. The APC modes include an L_APC mode, an M_APC mode, and an H_APC mode, which respectively correspond to a third amount-of-light control mode, a second amount-of-light control mode, and a first amount-of-light control mode. That is, the exposure device 22 has five operation modes: the OFF mode, the VIDEO mode, and, as the APC modes, the L_APC mode, the M_APC mode, and the H_APC mode. Among these modes, the M_APC mode and the L_APC mode are modes for determining threshold current values by performing APC with different amounts of light and sampling current values with respect to the respective amounts of light. That is, the M_APC mode and the L_APC mode are modes for executing bias APC to determine the value of the bias current Ibias. The H_APC mode is an APC mode for controlling the amount of light to which the photoconductive drum 15 is exposed to be equal to a target amount of light. The OFF mode is a mode for bringing a light-emitting element into an unlit state and also holding the respective current values sampled in the APC modes. The VIDEO mode is a mode in which a laser exposes the photoconductive drum 15 to light in accordance with an input PWM signal.

Figure 4:
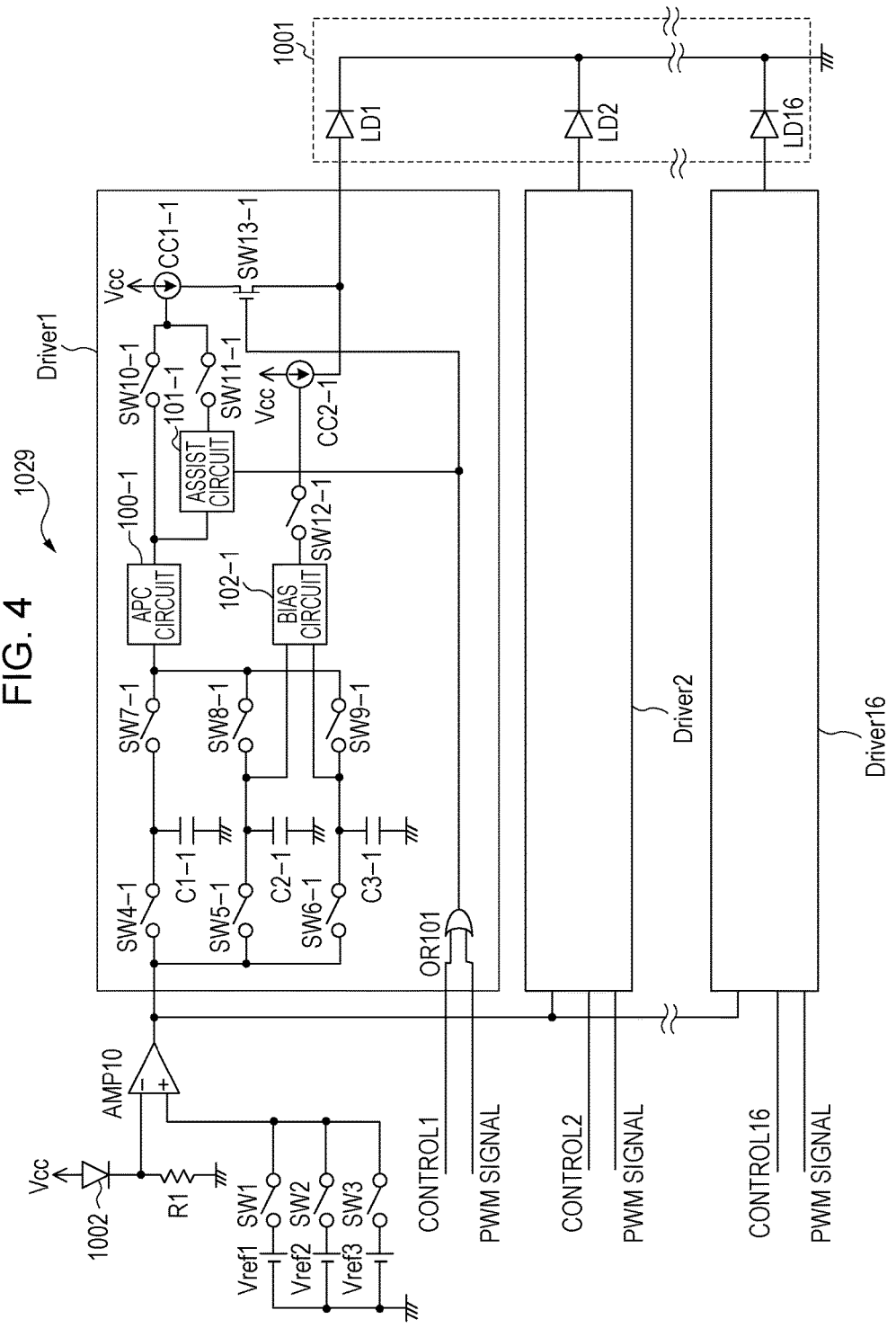
FIG. 4 illustrates laser drive circuits according to the exemplary embodiment.
Figure 5:
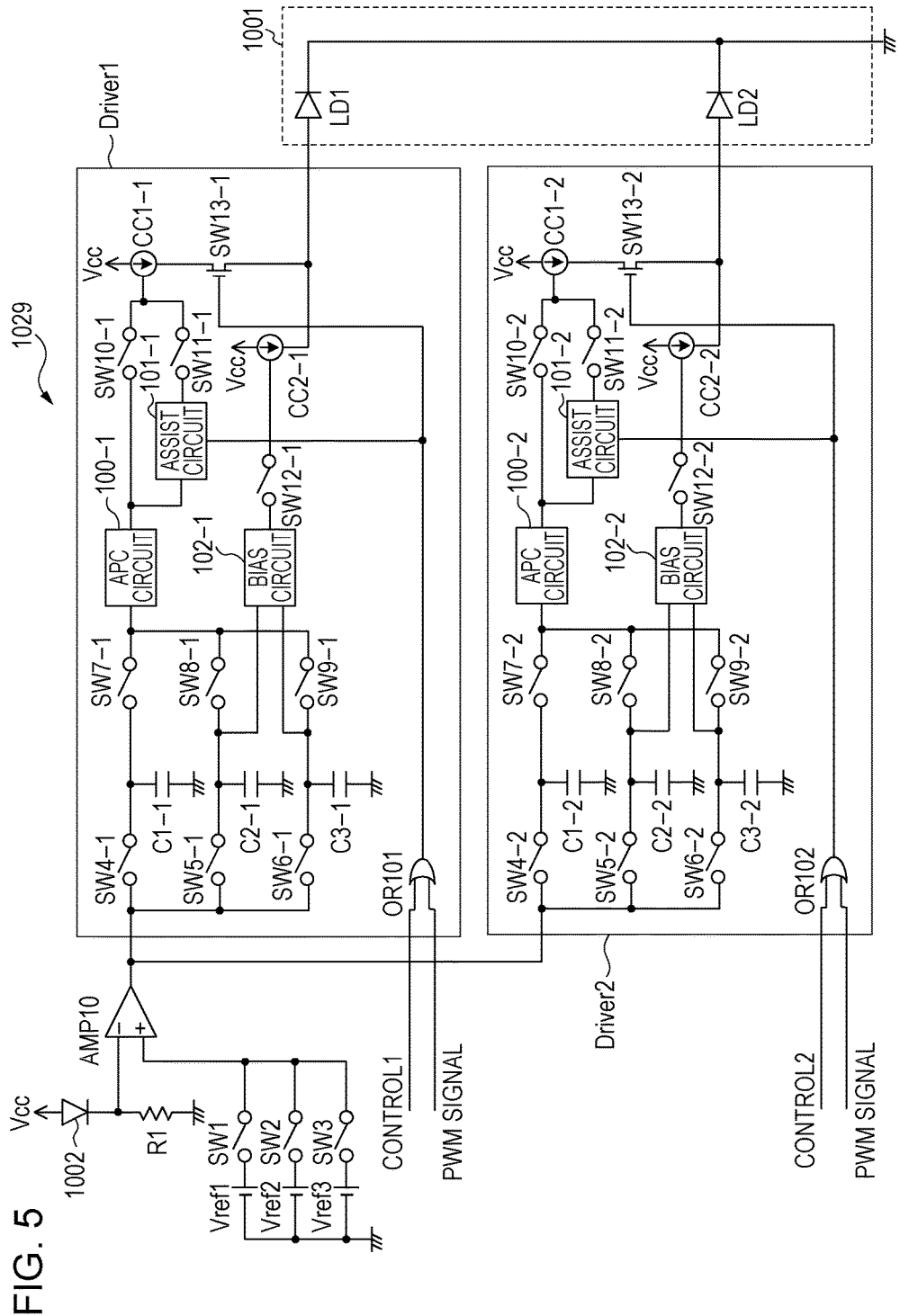
FIG. 5 illustrates laser drive circuits for two light-emitting elements according to the exemplary embodiment.

The operation of the individual modes will now be described. FIG. 4 illustrates a circuit of the laser driver 1029 illustrated in FIG. 2 when 16 light-emitting elements are used. FIG. 5 illustrates a circuit of the laser driver 1029 in a configuration including two light-emitting elements. A driver Driver1 is a unit for driving the light-emitting element LD1. A driver Driver2 is a unit for driving the light-emitting element LD2. In this exemplary embodiment, each of the drivers Driver1 and Driver2 forms a single integrated circuit (IC).

The controller 1027 outputs control signals for switching the control mode of the drivers Driver1 and Driver2 to an OR circuit 101 and an OR circuit 102 in the laser driver 1029, respectively, at various timings based on the BD signal. For example, for the laser driver 1029 illustrated in FIG. 5, the controller 1027 respectively outputs control signals CONTROL1 and CONTROL2 given in Table 1 to the OR circuit 101 and the OR circuit 102 to switch the control mode of the drivers Driver1 and Driver2. The control signals CONTROL1 and CONTROL2 are generated by using data0, data1, and data2 given in Table 1.

TABLE 1

| Control mode | data0 | data1 | data2 | CONTROL1 | CONTROL2 | PWM | SW13-1 | SW13-2 |
|---|---|---|---|---|---|---|---|---|
| APC_H_LD1 | 1 | 1 | 1 | High | Low | Low | ON | OFF |
| APC_M_LD1 | 1 | 1 | 0 | High | Low | Low | ON | OFF |
| APC_L_LD1 | 1 | 0 | 0 | High | Low | Low | ON | OFF |
| APC_H_LD2 | 0 | 0 | 1 | Low | High | Low | OFF | ON |
| APC_M_LD2 | 0 | 1 | 1 | Low | High | Low | OFF | ON |
| APC_L_LD2 | 0 | 1 | 0 | Low | High | Low | OFF | ON |
| VIDEO | 1 | 0 | 1 | Low | Low | High/Low | ON/OFF according to PWM signal | ON/OFF according to PWM signal |
| OFF | 0 | 0 | 0 | Low | Low | Low | OFF | OFF |

As given in Table 1, in the APC_H mode, the APC_M mode, and the APC_L mode of the light-emitting element LD1, the controller 1027 outputs a high-level control signal CONTROL1 and a low-level control signal CONTROL2. A low-level PWM signal is input to the OR circuit 101 and the OR circuit 102. Accordingly, a switch SW13-1, described below, is turned on, and the execution of the APC_H mode, the APC_M mode, and the APC_L mode is enabled for the light-emitting element LD1. In the APC_H mode, the APC_M mode, and the APC_L mode of the light-emitting element LD2, on the other hand, the controller 1027 outputs a low-level control signal CONTROL1 and a high-level control signal CONTROL2. A low-level PWM signal is input to the OR circuit 101 and the OR circuit 102. Accordingly, a switch SW13-2, described below, is turned on, and the execution of the APC_H mode, the APC_M mode, and the APC_L mode is enabled for the light-emitting element LD2.

The PD 1002 is a photoelectric conversion element that outputs a current having a value corresponding to the amount of light incident on the PD 1002. The PD 1002 is connected to a negative input terminal of an error amplifier AMP10. A voltage Vpd that is based on the value of the current output from the PD 1002 and the resistance value of a resistor R1 is applied to the negative input terminal of the error amplifier AMP10.

Switches SW1, SW2, and SW3 are connected to a positive input terminal of the error amplifier AMP10, and a reference voltage Vref1, a reference voltage Vref2, and a reference voltage Vref3 are connected to the switches SW1, SW2, and SW3, respectively.

The controller 1027 transmits to the laser driver 1029 a control signal for transitioning one of the drivers Driver1 and Driver2 to the first amount-of-light control mode. When one of the drivers Driver1 and Driver2 is in the first amount-of-light control mode, the switch SW1 is turned on and the switches SW2 and SW3 are turned off. Since the switch SW1 is turned on and the switches SW2 and SW3 are turned off, the voltage Vref1 is applied to the positive input terminal of the error amplifier AMP10. The error amplifier AMP10 compares the voltage Vpd at the negative input terminal with the voltage Vref1 at the positive input terminal. That is, the voltage Vref1 is a reference voltage to be compared with the voltage Vpd by the error amplifier AMP10 when one of the drivers Driver1 and Driver2 is in the first amount-of-light control mode.

The controller 1027 transmits to the laser driver 1029 a control signal for transitioning one of the drivers Driver1 and Driver2 to the second amount-of-light control mode. When one of the drivers Driver1 and Driver2 is in the second amount-of-light control mode, the switch SW2 is turned on and the switches SW1 and SW3 are turned off. Since the switch SW2 is turned on and the switches SW1 and SW3 are turned off, the voltage Vref2 is applied to the positive input terminal of the error amplifier AMP10. The error amplifier AMP10 compares the voltage Vpd at the negative input terminal with the voltage Vref2 at the positive input terminal. That is, the voltage Vref2 is a reference voltage to be compared with the voltage Vpd by the error amplifier AMP10 when one of the drivers Driver1 and Driver2 is in the second amount-of-light control mode.

The controller 1027 transmits to the laser driver 1029 a control signal for transitioning one of the drivers Driver1 and Driver2 to the third amount-of-light control mode. When one of the drivers Driver1 and Driver2 is in the third amount-of-light control mode, the switch SW3 is turned on and the switches SW1 and SW2 are turned off. Since the switch SW3 is turned on and the switches SW1 and SW2 are turned off, the voltage Vref3 is applied to the positive input terminal of the error amplifier AMP10. The error amplifier AMP10 compares the voltage Vpd at the negative input terminal with the voltage Vref3 at the positive input terminal. That is, the voltage Vref3 is a reference voltage to be compared with the voltage Vpd by the error amplifier AMP10 when one of the drivers Driver1 and Driver2 is in the third amount-of-light control mode.

The voltages Vref1, Vref2, and Vref3 respectively correspond to target amounts of light incident on the PD 1002 in the first amount-of-light control mode, the second amount-of-light control mode, and the third amount-of-light control mode. It is known at the time of design that the beam splitter 1010 separates an amount of light corresponding to 1% of the amount of laser light incident on the beam splitter 1010. Accordingly, controlling the amount of laser light incident on the PD 1002 to be equal to a target amount of light is equivalent to controlling the amount of laser light emitted from the laser light source 1001 to be equal to a target amount of light. The reference voltages Vref1, Vref2, and Vref3 satisfy Vref1 (a voltage corresponding to the first target amount of light) ≥Vref2 (a voltage corresponding to the second target amount of light) >Vref3 (a voltage corresponding to the third target amount of light). An output of the error amplifier AMP10 is input to the drivers Driver1 and Driver2.

Next, an internal configuration of the drivers Driver1 and Driver2 will be described. The drivers Driver1 and Driver2 have similar configurations and thus a description will be given of the driver Driver1, by way of example. The output of the error amplifier AMP10 input to the driver Driver1 is input to certain ends of switches SW4-1, SW5-1, SW6-1, and other ends of the switches SW4-1, SW5-1, and SW6-1 are connected to capacitors C1-1, C2-1, and C3-1, respectively. The switches SW4-1, SW5-1, and SW6-1 and the capacitors C1-1, C2-1, and C3-1 form respective sample-and-hold circuits. Each of the capacitors C1-1, C2-1, and C3-1 samples the output voltage of the error amplifier AMP10 when the corresponding one of the switches SW4-1, SW5-1, and SW6-1 is turned on in accordance with a control signal from the controller 1027. Further, each of the capacitors C1-1, C2-1, and C3-1 performs an operation of holding the output voltage of the error amplifier AMP10 When the corresponding one of the switches SW4-1, SW5-1, and SW6-1 is turned off.

The voltages held by the capacitors C1-1, C2-1, and C3-1 are output to an APC circuit 100-1, which is a switching current control unit, via switches SW7-1, SW8-1, and SW9-1, respectively. The APC circuit 100-1 controls the output voltage on the basis of the voltages input from the sample-and-hold circuits to control the amount of laser light to which the photoconductive drum 15 is exposed. For example, the APC circuit 100-1 adjusts the gain of the voltage input from the capacitor C1-1 in accordance with a gain control signal transmitted from the controller 1027, and outputs the resulting voltage.

The output voltage of the APC circuit 100-1 is input to a switch SW10-1 and an assist circuit 101-1. The assist circuit 101-1 is a correction unit and is a circuit for correcting a delay in a rising edge of the light-amount waveform of the laser light source 1001. An output voltage of the assist circuit 101-1 is input to a constant current source CC1-1, which is a current supply unit, via a switch SW11-1. The switches SW10-1 and SW11-1 serve as switching units configured to switch the state of the operation of the assist circuit 101-1.

The assist circuit 101-1 includes a differentiating circuit (not illustrated), for example. A high-level or low-level signal based on the PWM signal is input to the assist circuit 101-1 from the OR circuit 101. In response to an input of a high-level signal to the assist circuit 101-1, the differentiating circuit is activated. That is, the differentiating circuit corrects the output voltage of the APC circuit 100-1 so that a current Ioffset is supplied to the light-emitting element LD1 in synchronization with a rising edge (the start of the supply of a current Isw) of a current waveform illustrated in part (ii) of FIG. 3C. The differentiating circuit has a time constant, and a voltage input to the APC circuit 100-1 from the differentiating circuit attenuates with time in accordance with the time constant. The time constant is set in advance in accordance with how the light-amount waveform rises. The time constant may be dynamically changed in accordance with how the light-amount waveform rises. The assist circuit 101-1 operates in the manner described above, thereby allowing the current Ioffset to be superimposed on the current Isw in synchronization with the start of the supply of the current Isw.

The switches SW10-1 and SW11-1 are used to select one of the outputs of the APC circuit 100-1 and the assist circuit 101-1, and the selected output is input to the constant current source CC1-1. In this exemplary embodiment, the switches SW10-1 and SW11-1 are configured as separate switches. As described below, both the switches SW10-1 and SW11-1 are not turned on. In other words, when one of the switches SW10-1 and SW11-1 is turned on, the other switch is turned off. Hence, for example, the switches SW10-1 and SW11-1 may be configured as a single switch, that is, a switch having a contact on the constant current source CC1-1 side as a common contact.

The constant current source CC1-1 generates a current corresponding to the input signal, and supplies the generated current to the light-emitting element LD1 via a switch SW13-1 formed by a field-effect transistor (FET). When the switch SW11-1 is turned on and the assist circuit 101-1 is connected to the constant current source CC1-1, the current supplied from the constant current source CC1-1 is given by Isw+Ioffset (see FIG. 3C, described below), where the value of the current Isw (see FIG. 3C, described below), which is a first current value, is produced by the APC circuit 100-1 and the value of the current Ioffset is a current value (assist current value) used by the assist circuit 101-1 for correction. Furthermore, the voltages held in the capacitors C2-1 and C3-1 are also supplied directly to a bias circuit 102-1 without the interposition of a switch. An output of the bias circuit 102-1, which is a bias current control unit, is input to a constant current source CC2-1, which is a current supply unit, via a switch SW12-1. The constant current source CC2-1 generates a current corresponding to the input signal and supplies the generated current to the light-emitting element LD1. The current supplied from the constant current source CC2-1 is the bias current Ibias (see FIG. 3C, described below), which is a second current value. The constant current sources CC1-1 and CC2-1 are supplied with a power supply voltage Vcc.

The switches SW1 to SW3 and SW4-1 to SW12-1 are controlled by the controller 1027 to be turned on or off. The switch SW13-1 is controlled in accordance with an output from a logical sum circuit (the OR circuit 101). The control signal CONTROL1 output from the controller 1027 and the PWM signal sent from the PWM signal generation circuit 1032 are input to the OR circuit 101. An output of the OR circuit 101 is output to the assist circuit 101-1 and the switch SW13-1. In the L_APC mode, the M_APC mode, and the H_APC mode, the controller 1027 sets the control signal CONTROL1 to a high level to turn on the switch SW13-1. In the OFF mode and the VIDEO mode, the controller 1027 sets the control signal CONTROL1 to a low level so that, in the VIDEO mode, the switch SW13-1 is turned on or off in accordance with the PWM signal (see Table 1). The constant current sources CC1-1 and CC2-1, the assist circuit 101-1, the bias circuit 102-1, and the switches SW10-1 and SW11-1 are provided for each of a plurality of light-emitting elements.

APC Modes

Figure 6:
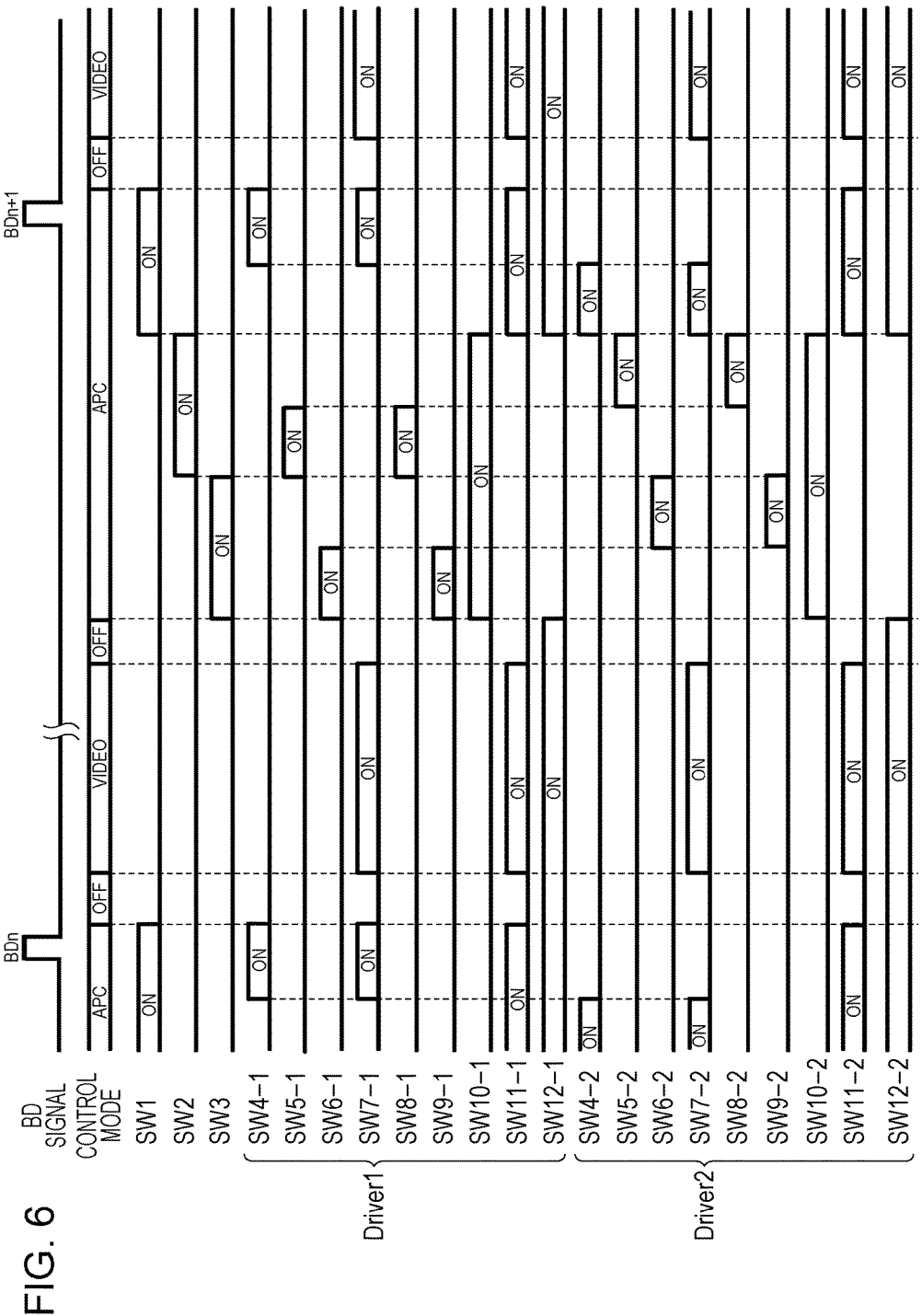
FIG. 6 is a timing chart for executing various modes in a scan period according to the exemplary embodiment.

Various modes in a scan period will now be described with reference to a timing chart illustrated in FIG. 6. In a scan period, a BD signal is generated in response to laser light emitted from the light-emitting element LD1 being incident on the BD 1017 in the first amount-of-light control mode of the light-emitting element LD1. The period from a pulse BDn to a subsequent pulse BDn+1 of the BD signal is a scan period. The laser driver 1029 transitions from one control mode to another within a scan period in a manner illustrated in FIG. 6. Each switch is turned on in a period labeled with "ON" in FIG. 6 and is turned off in a period other than the "ON" period.

L_APC Mode

Figure 7:
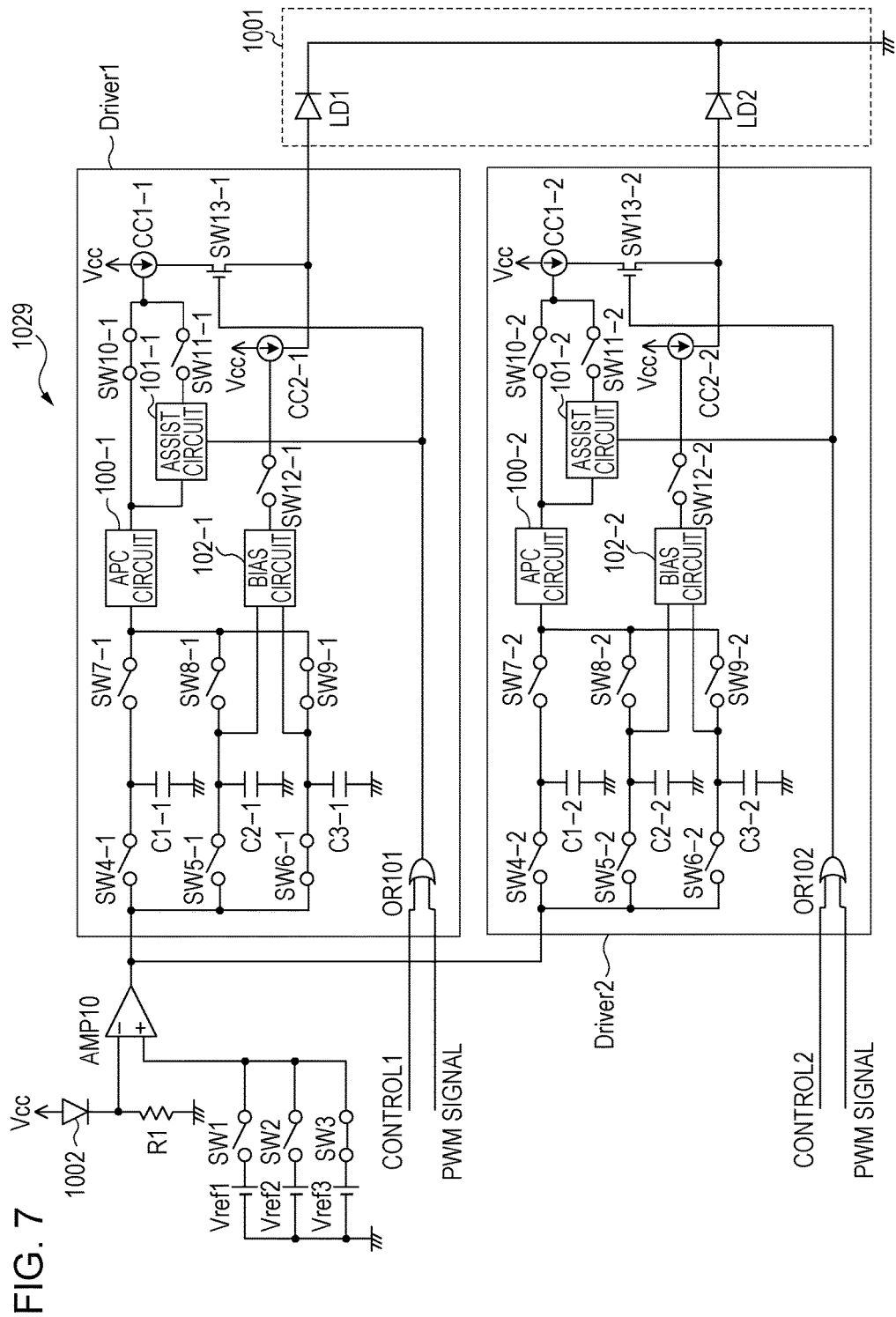
FIG. 7 illustrates the laser drive circuits according to the exemplary embodiment when an L_APC mode is executed.

In the L_APC mode of the light-emitting element LD1, as illustrated in FIG. 7, the controller 1027 controls the switch SW3 to be turned on. The controller 1027 further controls the switches SW6-1, SW9-1, SW10-1, and SW13-1 in the driver Driver1 to be turned on, and controls the switches SW4-1, SW5-1, SW7-1, and SW8-1 to be turned off. As a result of controlling the switches SW4-1 and SW5-1 to be turned off, the sample-and-hold circuit including the capacitor C1-1 and the sample-and-hold circuit including the capacitor C2-1 in the driver Driver1 do not sample an output from the error amplifier AMP10.

In the L_APC mode of the light-emitting element LD1, the controller 1027 controls switches SW4-2, SW5-2, and SW6-2 in the driver Driver2 to be turned off. In the manner described above, since the switches SW4-2, SW5-2, and SW6-2 are turned off, sample-and-hold circuits in the driver Driver2 do not sample an output from the error amplifier AMP10.

Since the switch SW3 is turned on, the error amplifier AMP10 compares the voltage Vpd input to the negative input terminal with the reference voltage Vref3 input to the positive input terminal. The error amplifier AMP10 controls the voltage of the capacitor C3-1 in accordance with a comparison result. Since the switch SW9-1 is turned on and the switches SW7-1 and SW8-1 are turned off, the voltage of the capacitor C3-1 is input to the APC circuit 100-1. Since the switch SW12-1 is turned off, the output of the bias circuit 102-1 is not output to the constant current source CC2-1. That is, the current flowing through the light-emitting element LD1 in the L_APC mode does not include the bias current Ibias.

An output of the APC circuit 100-1 is output to the switch SW10-1 and the assist circuit 101-1. Since the switch SW10-1 is turned on, the output of the APC circuit 100-1 is output to the constant current source CC1-1. Since the switch SW11-1 is turned off, an output of the assist circuit 101-1 is not output to the constant current source CC1-1. That is, the current flowing through the light-emitting element LD1 in the L_APC mode does not include an assist current value for correcting a rising edge. Since the switch SW13-1 is turned on, the constant current source CC1-1 supplies a current corresponding to the input thereof to the light-emitting element LD1 via the switch SW13-1 to drive the light-emitting element LD1. Laser light emitted from the light-emitting element LD1 is detected by the PD 1002 via the beam splitter 1010 illustrated in FIG. 2. Since a negative feedback circuit is formed by the operation described above, the amount of laser light emitted from the light-emitting element LD1 is controlled to be equal to the reference voltage Vref3.

In the L_APC mode of the light-emitting element LD2, the operations of the drivers Driver1 and Driver2 are opposite to those in the L_APC mode of the light-emitting element LD1. The operation of the driver Driver2 in the L_APC mode of the light-emitting element LD2 is similar to the operation of the driver Driver1 in the L_APC mode of the light-emitting element LD1 and is not described herein.

M_APC Mode

Figure 8:
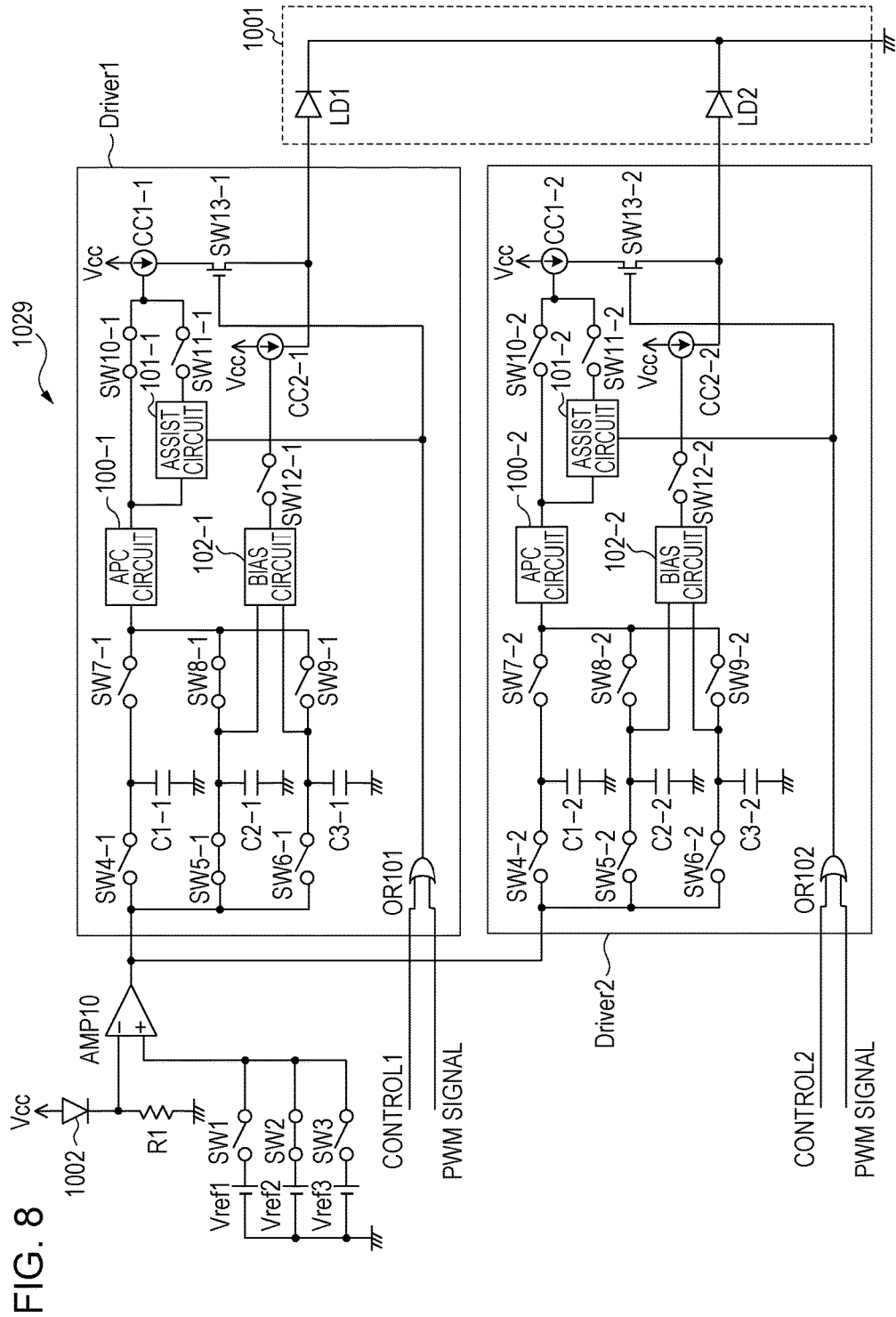
FIG. 8 illustrates the laser drive circuits according to the exemplary embodiment when an M_APC mode is executed.

In the M_APC mode of the light-emitting element LD1, as illustrated in FIG. 8, the controller 1027 controls the switch SW2 to be turned on. The controller 1027 further controls the switches SW5-1, SW8-1, SW10-1, and SW13-1 in the driver Driver1 to be turned on, and controls the switches SW4-1, SW6-1, SW7-1, and SW9-1 to be turned off. As a result of controlling the switches SW4-1 and SW6-1 to be turned off, the sample-and-hold circuit including the capacitor C1-1 and the sample-and-hold circuit including the capacitor C3-1 in the driver Driver1 do not sample an output from the error amplifier AMP10.

In the M_APC mode of the light-emitting element LD1, the controller 1027 controls switches SW4-2, SW5-2, and SW6-2 in the driver Driver2 to be turned off. In the manner described above, since the switches SW4-2, SW5-2, and SW6-2 are turned off, sample-and-hold circuits in the driver Driver2 do not sample an output from the error amplifier AMP10.

Since the switch SW2 is turned on, the error amplifier AMP10 compares the voltage Vpd input to the negative input terminal with the reference voltage Vref2 input to the positive input terminal. The error amplifier AMP10 controls the voltage of the capacitor C2-1 in accordance with a comparison result. Since the switch SW8-1 is turned on and the switches SW7-1 and SW9-1 are turned off, the voltage of the capacitor C2-1 is input to the APC circuit 100-1. Since the switch SW12-1 is turned off, the output of the bias circuit 102-1 is not output to the constant current source CC2-1. That is, the current flowing through the light-emitting element LD1 in the M_APC mode does not include the bias current Ibias.

An output of the APC circuit 100-1 is output to the switch SW10-1 and the assist circuit 101-1. Since the switch SW10-1 is turned on, the output of the APC circuit 100-1 is output to the constant current source CC1-1. Since the switch SW11-1 is turned off, an output of the assist circuit 101-1 is not output to the constant current source CC1-1. That is, the current flowing through the light-emitting element LD1 in the M_APC mode does not include an assist current value for correcting a rising edge. Since the switch SW13-1 is turned on, the constant current source CC1-1 supplies a current corresponding to the input thereof to the light-emitting element LD1 via the switch SW13-1 to drive the light-emitting element LD1. Laser light emitted from the light-emitting element LD1 is detected by the PD 1002 via the beam splitter 1010 illustrated in FIG. 2. Since a negative feedback circuit is formed by the operation described above, the amount of laser light emitted from the light-emitting element LD1 is controlled to be equal to the amount of light determined by the reference voltage Vref2.

In the M_APC mode of the light-emitting element LD2, the operations of the drivers Driver1 and Driver2 are opposite to those in the M_APC mode of the light-emitting element LD1. The operation of the driver Driver2 in the M_APC mode of the light-emitting element LD2 is similar to the operation of the driver Driver1 in the M_APC mode of the light-emitting element LD1 and is not described herein.

H_APC Mode

Figure 9:
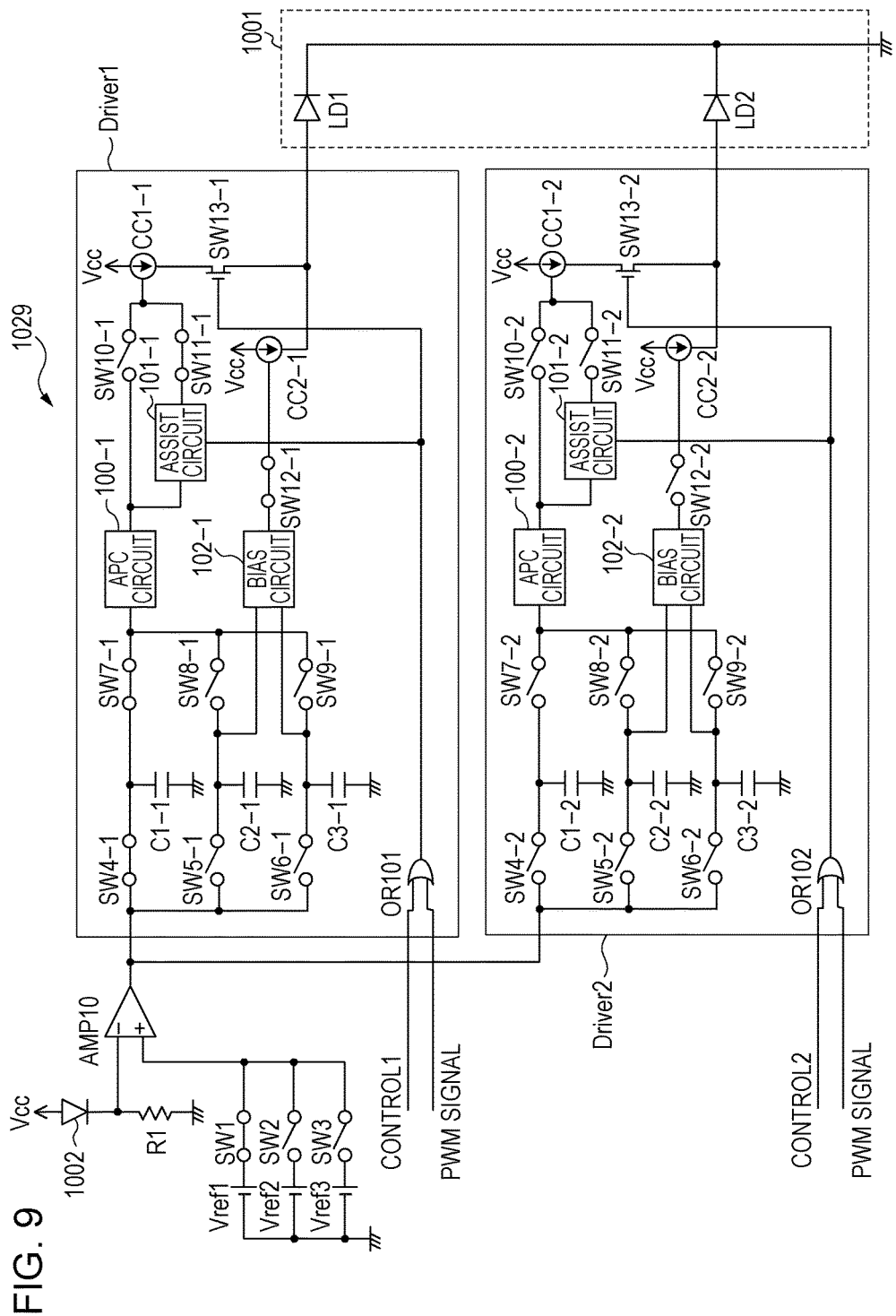
FIG. 9 illustrates the laser drive circuits according to the exemplary embodiment when an H_APC mode is executed.

In the H_APC mode of the light-emitting element LD1, as illustrated in FIG. 9, the controller 1027 controls the switch SW1 to be turned on. The controller 1027 further controls the switches SW4-1, SW7-1, SW11-1, SW12-1, and SW13-1 to be turned on and controls the switches SW5-1, SW6-1, SW8-1, and SW9-1 to be turned off.

As a result of controlling the switches SW5-1 and SW6-1 to be turned off, the sample-and-hold circuit including the capacitor C2-1 and the sample-and-hold circuit including the capacitor C3-1 in the driver Driver1 do not sample an output from the error amplifier AMP10. That is, the capacitor C3-1 holds the output of the error amplifier AMP10 in the L_APC mode, and the capacitor C2-1 holds the output of the error amplifier AMP10 in the M_APC mode. The voltages of the capacitors C2-1 and C3-1 are output to the bias circuit 102-1. The bias circuit 102-1 outputs a voltage corresponding to the bias current Ibias (see FIG. 3C, described below) on the basis of the voltages input from the capacitors C2-1 and C3-1.

Figure 3B:
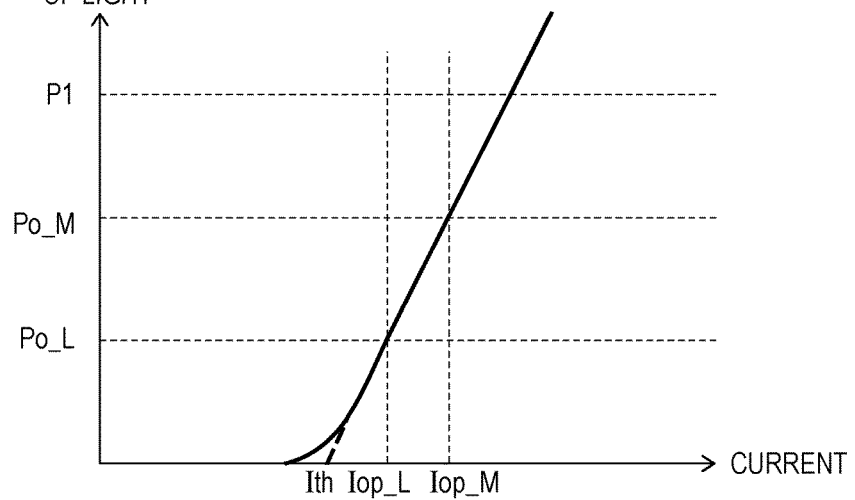
FIG. 3B illustrates bias APC.

An operation performed by the bias circuit 102-1 to set the bias current Ibias will be described with reference to FIG. 3B. FIG. 3B is a graph plotting the current flowing through the light-emitting element LD1 on the horizontal axis and the amount of light emitted from the light-emitting element LD1 on the vertical axis, and illustrates a current versus light output (I-L) characteristic of the laser light source 1001. In the L_APC mode, the amount of light emitted from the light-emitting element LD1 is assumed to be equal to a first amount of light Po_L, and the current flowing through the light-emitting element LD1 is assumed to be equal to a third current value Iop_L. In the M_APC mode, the amount of light emitted from the light-emitting element LD1 is assumed to be equal to a second amount of light Po_M, and the value of the current flowing through the light-emitting element LD1 is assumed to be equal to a fourth current value Iop_M. In this case, the threshold current value Ith is expressed by (Po_M×Iop_L−Po_L×Iop_M)/(Po_M−Po_L).

On the other hand, the amount of light Po_M emitted from the light-emitting element LD1 in the M_APC mode is determined by the reference voltage Vref2, and the amount of light Po_L emitted from the light-emitting element LD1 in the L_APC mode is determined by the reference voltage Vref3. In addition, the currents (which are also drive currents) Iop_M and Iop_L flowing through the light-emitting element LD1 are determined by using the voltages of the capacitors C2-1 and C3-1. Hence, the threshold current value Ith is expressed by (Vref2×C3-1−Vref3×C2-1)/(Vref2−Vref3).

The bias circuit 102-1 determines the threshold current value Ith by using the formulas described above, and the constant current source CC2-1 supplies the bias current Ibias to the light-emitting element LD1 in accordance with the determined threshold current value Ith.

Since the switch SW1 is turned on, the error amplifier AMP10 compares the voltage Vpd input to the negative input terminal with the reference voltage Vref1 input to the positive input terminal. The error amplifier AMP10 controls the voltage of the capacitor C1-1 in accordance with a comparison result. Since the switch SW7-1 is turned on, the voltage of the capacitor C1-1 is input to the APC circuit 100-1.

An output of the APC circuit 100-1 is input to the assist circuit 101-1. Since the switch SW11-1 is turned on, the output of the assist circuit 101-1 is output to the constant current source CC1-1. That is, the current flowing through the light-emitting element LD1 in the H_APC mode includes not only the bias current Ibias but also an assist current value that is a correction value for correcting a delay time at a rising edge of the light-amount waveform. Since the switch SW13-1 is turned on, the constant current source CC1-1 supplies a current corresponding to the input thereof to the light-emitting element LD1 via the switch SW13-1 to drive the light-emitting element LD1. Laser light emitted from the light-emitting element LD1 is detected by the PD 1002 via the beam splitter 1010 illustrated in FIG. 2. Since a negative feedback circuit is formed by the operation described above, the amount of laser light emitted from the light-emitting element LD1 is controlled to be equal to the amount of light determined by the reference voltage Vref1. In FIG. 3B, an amount of light determined by the reference voltage Vref1 is represented by P1.

In the H_APC mode of the light-emitting element LD2, the operations of the drivers Driver1 and Driver2 are opposite to those in the H_APC mode of the light-emitting element LD1. The operation of the driver Driver2 in the H_APC mode of the light-emitting element LD2 is similar to the operation of the driver Driver1 in the H_APC mode of the light-emitting element LD1 and is not described herein.

OFF Mode

Figure 10:
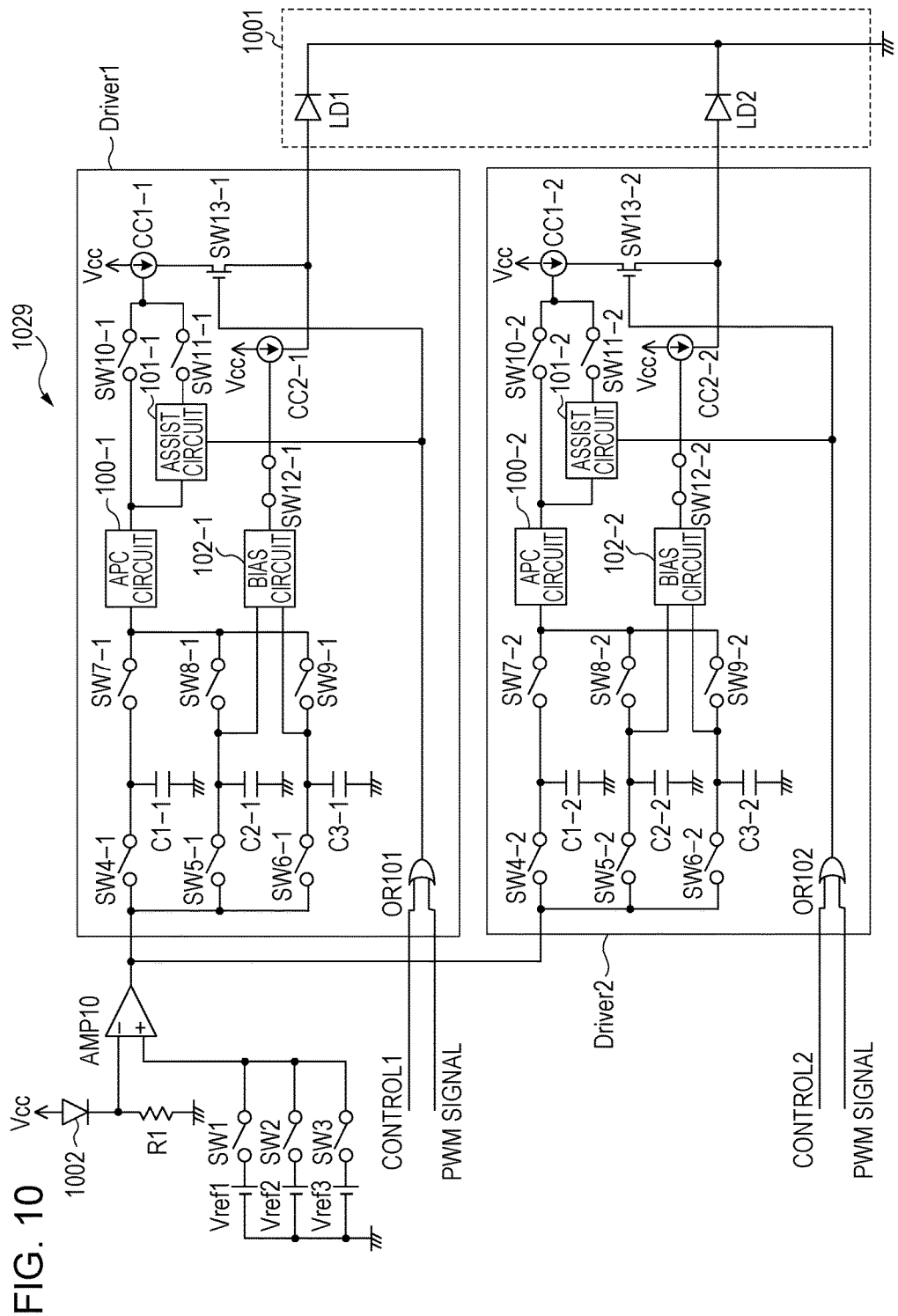
FIG. 10 illustrates the laser drive circuits according to the exemplary embodiment when an OFF mode is executed.

In the OFF mode, as illustrated in FIG. 10, the controller 1027 controls the switch SW12-1 to be turned on and controls the other switches to be turned off. Since the switches SW4-1, SW5-1, and SW6-1 are turned off, the voltages of the capacitors C1-1, C2-1, and C3-1 are held. Furthermore, since the switch SW13-1 is turned off, an output of the constant current source CC1-1 is not supplied to the light-emitting element LD1. Since the switch SW12-1 is turned on, the bias current Ibias is supplied from the constant current source CC2-1 to the light-emitting element LD1 on the basis of the threshold current value Ith determined by the bias circuit 102-1. Thus, only the bias current Ibias is supplied to the light-emitting element LD1, which results in the light-emitting element LD1 emitting a small amount of light. The bias circuit 102-1 is supplied with the voltages held by the capacitors C2-1 and C3-1. The operation of the driver Driver2 in the OFF mode is similar to that of the driver Driver1 and is not described herein.

VIDEO Mode

Figure 11:
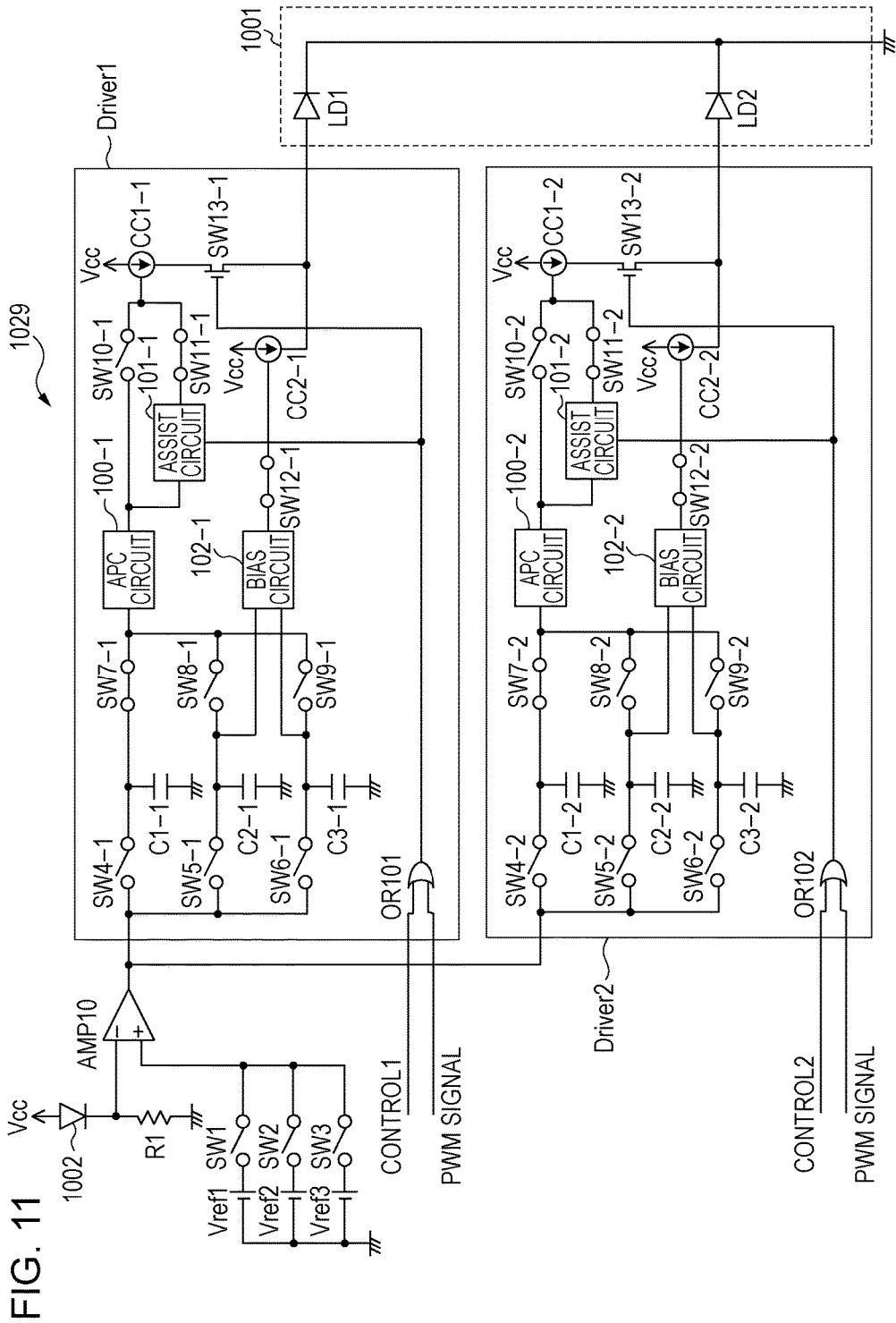
FIG. 11 illustrates the laser drive circuits according to the exemplary embodiment when a VIDEO mode is executed.

In the VIDEO mode, as illustrated in FIG. 11, the controller 1027 controls the switches SW7-1, SW11-1, and SW12-1 to be turned on. In the VIDEO mode, on the other hand, the controller 1027 controls the switches SW4-1, SW5-1, SW6-1, SW8-1, SW9-1, and SW10-1 to be turned off.

In the VIDEO mode, as a result of turning off the switches SW4-1, SW5-1, and SW6-1, the sample-and-hold circuits do not sample an output from the error amplifier AMP10. That is, the capacitor C3-1 holds the output of the error amplifier AMP10 in the L_APC mode. The capacitor C2-1 holds the output of the error amplifier AMP10 in the M_APC mode. The capacitor C1-1 holds the output of the error amplifier AMP10 in the H_APC mode. In the VIDEO mode, therefore, the voltages of the capacitors C1-1, C2-1, and C3-1 do not vary due to factors other than self-discharge.

Since the switch SW7-1 is turned on and the switches SW8-1 and SW9-1 are turned off, the voltage of the capacitor C1-1 is input to the APC circuit 100-1. Thus, the APC circuit 100-1 operates in accordance with the voltage of the capacitor C1-1. In the VIDEO mode, since the switch SW11-1 is turned on and the switch SW10-1 is turned off, the output of the APC circuit 100-1 is input to the constant current source CC1-1 via the assist circuit 101-1. The constant current source CC1-1 outputs a switching current Isw having a value corresponding to the input signal from the assist circuit 101-1.

Figure 3C:
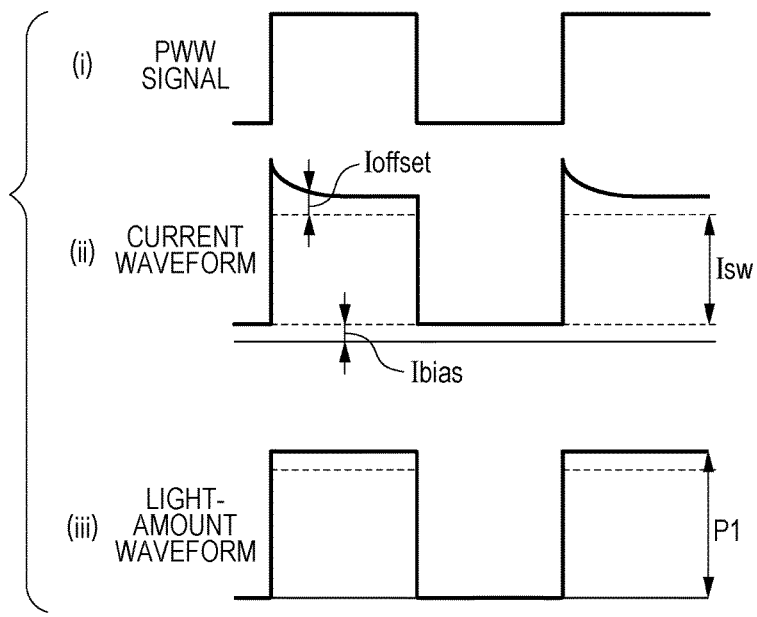
FIG. 3C illustrates a correction operation.

The switch SW13-1 is controlled by the PWM signal via the OR circuit 101. An operation of correcting a delay in a rising period of the light-amount waveform of the light-emitting element LD1 in the VIDEO mode will be described with reference to FIG. 3C. In FIG. 3C, part (i) illustrates the waveform of the PWM signal, part (ii) illustrates the waveform of the current (hereinafter referred to as current waveform) supplied to the light-emitting element LD1, and part (iii) illustrates the waveform representing the amount of light emitted from the light-emitting element LD1. In parts (i) to (iii) of FIG. 3C, the horizontal axis represents time. The switch SW13-1 is turned on when the PWM signal is at a high level, and the switch SW13-1 is turned off when the PWM signal is at a low level.

First, when the input PWM signal is at a low level and the switch SW13-1 is in an off state, as in the OFF mode, the switch SW12-1 is in an on state. Thus, the output of the constant current source CC2-1 is supplied to the light-emitting element LD1. Accordingly, as illustrated in part (ii) of FIG. 3C, the light-emitting element LD1 is supplied with the bias current Ibias.

When the PWM signal is set to a high level and the switch SW13-1 is turned on, on the other hand, the following operation is performed. Since the switch SW7-1 is turned on, the voltage held in the capacitor C1-1 is output to the APC circuit 100-1. Furthermore, the output of the APC circuit 100-1 is input to the assist circuit 101-1. The PWM signal is also input to the assist circuit 101-1 via the OR circuit 101. Thus, the assist circuit 101-1 supplies a control signal to the constant current source CC1-1 via the switch SW11-1 so as to obtain a current value larger than the current value determined by the capacitor C1-1. Accordingly, as illustrated in part (ii) of FIG. 3C, the light-emitting element LD1 exhibits the current waveform which has a large rising edge due to the large current supplied from the constant current source CC1-1 via the switch SW13-1. Thus, as illustrated in part (iii) of FIG. 3C, the delay in the rising period of the light-amount waveform of the light-emitting element LD1 is corrected.

After the light-amount waveform rises, the assist circuit 101-1 controls the output of the constant current source CC1-1 so that the amount of light emitted from the light-emitting element LD1 is equal to the amount of light determined by the reference voltage Vref1. At this time, an offset voltage added by the assist circuit 101-1 is superimposed on the output of the assist circuit 101-1, and the offset current Ioffset is also superimposed on the output of the constant current source CC1-1. That is, a current waveform indicated by a solid line in part (ii) of FIG. 3C indicates Ibias+Isw+Ioffset. However, since APC is also performed by using the output of the assist circuit 101-1 in the H_APC mode, the voltage of the capacitor C1-1 is held so as to obtain an amount of light (P1) determined by the reference voltage Vref1 which includes the offset current Ioffset. Accordingly, the light-emitting element LD1 is driven to emit light with an amount of light determined by the reference voltage Vref1 in accordance with the PWM signal. The operation of the driver Driver2 in the VIDEO mode is similar to that of the driver Driver1 and is not described herein.

According to this exemplary embodiment, it may be possible to prevent or substantially reduce a decrease in accuracy with which the value of the bias current Ibias is set without being affected by an assist current.

The present invention is not limited to the embodiment described above, and various changes and modifications can be made without departing from the spirit and scope of the present invention. Therefore, to apprise the public of the scope of the present invention, the following claims are made.

According to an aspect of the present invention, it may be possible to prevent or substantially reduce a decrease in accuracy with which a bias current value is set.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image forming apparatus for forming an image based on input image data, comprising:
    a semiconductor laser including a light-emitting element configured to emit laser light;
    a light-receiving element configured to receive the laser light emitted from the light-emitting element;
    a deflection unit configured to deflect the laser light emitted from the light-emitting element so that the laser light scans a photoconductor;
    a drive unit configured to drive the semiconductor laser, the drive unit including
        a current supply unit configured to supply a current to the light-emitting element, the current supply unit being configured to, in at least a period during which the laser light scans the photoconductor, supply a bias current to the light-emitting element regardless of the image data and supply a switching current to be superimposed on the bias current to the light-emitting element on the basis of the image data,
        a correction unit configured to correct a value of the current supplied from the current supply unit to the light-emitting element to correct a rising edge of a waveform representing an amount of laser light emitted from the light-emitting element, and a bias current control unit configured to control a value of the bias current in accordance with a light receiving result of the light-receiving element which has received the laser light emitted from the light-emitting element upon a current being supplied to the light-emitting element; and a control unit configured to switch a state of an operation performed by the correction unit for the current supplied to the light-emitting element, in such a manner that the correction unit corrects a value of the switching current when the switching current is supplied to the light-emitting element on the basis of the image data and in such a manner that the correction unit does not correct a value of the current supplied from the current supply unit to the light-emitting element when the laser light is made incident on the light-receiving element to control the value of the bias current.

2. The image forming apparatus according to claim 1, wherein the drive unit further includes a switching current control unit configured to control a value of the switching current supplied to the light-emitting element by the current supply unit in accordance with a light receiving result of the light-receiving element which has received the laser light emitted from the light-emitting element upon a current being supplied to the light-emitting element, wherein the current supply unit supplies currents to the light-emitting element so that an amount of light of laser light incident on the light-receiving element is equal to a first target amount of light, a second target amount of light lower than the first target amount of light, and a third target amount of light lower than the second target amount of light, wherein the switching current control unit controls the value of the switching current on the basis of a value of the current supplied from the current supply unit to the light-emitting element so that the amount of light of the laser light incident on the light-receiving element is equal to the first target amount of light, and wherein the bias current control unit controls the value of the bias current on the basis of a value of the current supplied from the current supply unit to the light-emitting element so that the amount of light of the laser light incident on the light-receiving element is equal to the second target amount of light and on the basis of a value of the current supplied from the current supply unit to the light-emitting element so that the amount of light of the laser light incident on the light-receiving element is equal to the third target amount of light.

3. The image forming apparatus according to claim 2, wherein in a case where the current supply unit supplies currents to the light-emitting element so that the amount of light of the laser light incident on the light-receiving element is equal to the second target amount of light and the third target amount of light, the control unit causes the correction unit not to perform an operation for the currents.

4. The image forming apparatus according to claim 3, wherein in a case where the current supply unit supplies a current to the light-emitting element so that the amount of light of the laser light incident on the light-receiving element is equal to the first target amount of light, the control unit causes the correction unit to correct a value of the current.

5. The image forming apparatus according to claim 1, wherein the correction unit performs an operation for the current supplied to the light-emitting element so as to correct a rising edge of a waveform representing an amount of light of laser light emitted from the light-emitting element.

6. The image forming apparatus according to claim 1, further comprising a beam splitter disposed between the light-emitting element and the deflection unit along an optical path of laser light emitted from the light-emitting element, the beam splitter being configured to separate the laser light emitted from the light-emitting element into laser light directed toward the deflection unit and laser light directed toward the light-receiving element, wherein the light-receiving element receives the laser light separated by the beam splitter.

7. The image forming apparatus according to claim 1, wherein the semiconductor laser comprises a vertical-cavity surface-emitting laser including a plurality of light-emitting elements each configured to emit laser light, and wherein the current supply unit, the correction unit, the bias current control unit, and the control unit are disposed for each of the plurality of light-emitting elements of the vertical-cavity surface-emitting laser.

8. The image forming apparatus according to claim 1, further comprising:

a switching current control unit configured to control a value of the switching current supplied to the light-emitting element by the current supply unit in accordance with a light receiving result of the light-receiving element which has received laser light emitted from the light-emitting element upon a current being supplied to the light-emitting element; and a controller configured to execute first amount-of-light control, second amount-of-light control, and third amount-of-light control at different timings, the first amount-of-light control being control in which the current supply unit supplies a current to the light-emitting element so that an amount of light of laser light incident on the light-receiving element is equal to a first target amount of light, the second amount-of-light control being control in which the current supply unit supplies a current to the light-emitting element so that the amount of light of the laser light incident on the light-receiving element is equal to a second target amount of light lower than the first target amount of light, the third amount-of-light control being control in which the current supply unit supplies a current to the light-emitting element so that the amount of light of the laser light incident on the light-receiving element is equal to a third target amount of light lower than the second target amount of light, wherein the switching current control unit controls the value of the switching current on the basis of a value of the current supplied from the current supply unit to the light-emitting element so that the amount of light of the laser light incident on the light-receiving element is equal to the first target amount of light in the first amount-of-light control, and wherein the bias current control unit controls the value of the bias current on the basis of a value of the current supplied from the current supply unit to the light-emitting element so that the amount of light of the laser light incident on the light-receiving element is equal to the second target amount of light in the second amount-of-light control and on the basis of a value of the current supplied from the current supply unit to the light-emitting element so that the amount of light of the laser light incident on the light-receiving element is equal to the third target amount of light in the third amount-of-light control.

9. The image forming apparatus according to claim 8, wherein the control unit is controlled in accordance with a control signal from the controller so that the correction unit does not correct a value of the current supplied from the current supply unit to the light-emitting element in the second amount-of-light control and the third amount-of-light control.

10. The image forming apparatus according to claim 9, wherein the control unit is controlled in accordance with a control signal from the controller so that the correction unit corrects a value of the current supplied from the current supply unit to the light-emitting element in the first amount-of-light control.

11. The image forming apparatus according to claim 8, further comprising
a beam splitter disposed between the semiconductor laser and the deflection unit along an optical path of laser light emitted from the semiconductor laser, the beam splitter being configured to separate the laser light emitted from the semiconductor laser into laser light directed toward the deflection unit and laser light directed toward the light-receiving element,
wherein the light-receiving element receives the laser light separated by the beam splitter.

12. The image forming apparatus according to claim 8, wherein the semiconductor laser comprises a vertical-cavity surface-emitting laser including a plurality of light-emitting elements each configured to emit laser light, and
wherein the current supply unit, the correction unit, the bias current control unit, and the control unit are disposed for each of the plurality of light-emitting elements of the vertical-cavity surface-emitting laser.

13. The image forming apparatus according to claim 8, wherein the controller executes the first amount-of-light control, the second amount-of-light control, and the third amount-of-light control on each of the plurality of light-emitting elements at different timings.

14. The image forming apparatus according to claim 1, further comprising:
the photoconductor;
a developing unit configured to develop an electrostatic latent image formed on the photoconductor with toner to produce a toner image; and
a transfer unit configured to transfer the toner image produced by the developing unit onto a recording medium.

* * * * *